No. 891,947. PATENTED JUNE 30, 1908.
J. H. K. McCOLLUM.
AUTOMATIC CAR BRAKE.
APPLICATION FILED NOV. 17, 1906.
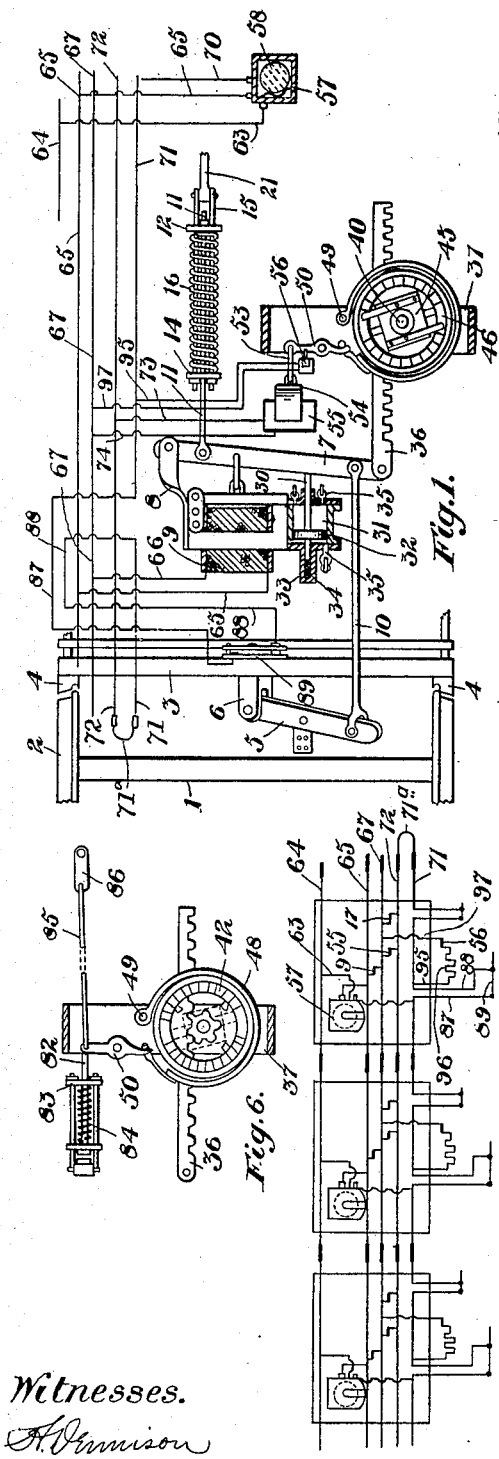
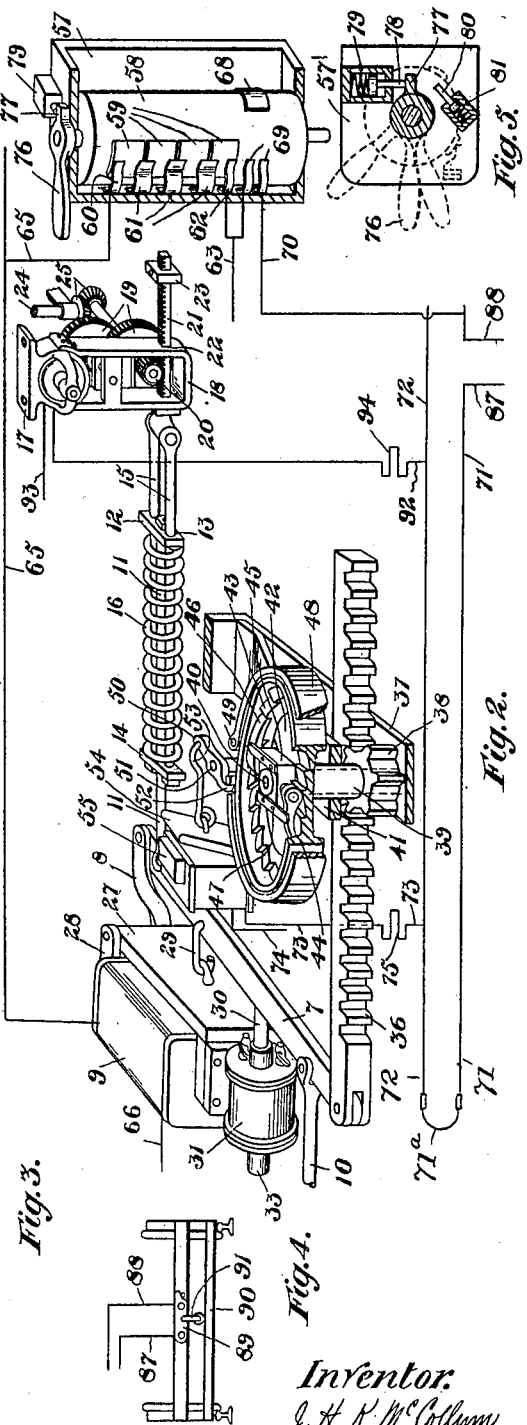
Witnesses.
Inventor.
J. H. K. McCollum
by C. J. Fetherstonhaugh
Atty.

UNITED STATES PATENT OFFICE.

JAMES HARRY KEIGHLY McCOLLUM, OF TORONTO, ONTARIO, CANADA.

AUTOMATIC CAR-BRAKE.

No. 891,947.      Specification of Letters Patent.      Patented June 30, 1908.

Application filed November 17, 1906. Serial No. 343,914.

*To all whom it may concern:*

Be it known that I, JAMES HARRY KEIGHLY McCOLLUM, a subject of the King of Great Britain, resident of the city of Toronto, county of York, Province of Ontario, in the Dominion of Canada, have invented certain new and useful Improvements in Automatic Car-Brakes, of which the following is a specification.

The invention relates to improvements in automatic car brakes as described in the present specification and set forth in the accompanying drawings that form part of the same.

The invention consists essentially in the novel construction and arrangement of parts whereby a brake mechanism is electrically released and held in the released position and whereby mechanical means are employed in applying the brakes.

The objects of the invention are to devise an electrically controlled, positive acting brake which may be easily and quickly operated and which will operate automatically on the cutting off of the supply of electric energy to the propelling mechanism of the vehicle, and to effect a simple, cheap and durable construction economic in its operation.

In the drawings Figure 1 is a plan view of the brake mechanism and the electrically operated controlling device, as arranged beneath the body of a car, shown partly in horizontal section. Fig. 2 is an enlarged perspective view of a portion of the brake controlling mechanism showing the electrical connections diagrammatically. Fig. 3 is a diagrammatic view of the wiring for a train of cars equipped with my automatic brake. Fig. 4 is an end elevation of a pair of car wheels showing a switch secured to the car gear and a depending beam for operating said switch. Fig. 5 is a detail plan view of the brake controller and handle and the means for regulating the movement of said handle partly in section. Fig. 6 is a detail plan view of a mechanical means for holding and releasing the brake mechanism.

Like numerals of reference indicate corresponding parts in each figure.

Referring to the drawings, 1 is an axle of the car and 2 a pair of wheels.

3 is the brake beam suspended from the truck in the usual manner and 4 are the brake shoes secured to said brake beam.

5 is the brake lever pivotally secured at one end to the bracket 6 from the brake beam 3 and pivotally supported intermediate of its length from the car truck in any suitable manner.

7 is a lever pivoted at one end to the bracket 8 rigidly supported at one end of an electro-magnet 9, said electro-magnet being supported in any suitable manner from the car body. The bracket 8 is shown secured to the magnet 9 but it may be secured direct to the car body.

10 is a rod pivoted at one end to the free end of the lever 5 and at its other end to the lever 7 near its outer end.

11 is a rod secured to the lever 7 near its pivotal point.

12 is a plate fixedly secured on the outer end of said rod and having the circular orifices 13 therethrough to each side of the center.

14 is a plate having a central circular orifice therethrough and slidably arranged on the rod 11 to the inside of the plate 12.

15 are rods inserted through the orifices 13 in the plate 12 and slidably arranged therein, said rods 15 being fixedly secured to the plate 14 at their inner ends. The rods 15 move in a parallel direction to the rod 11.

16 is a spiral compression spring encircling the rods 11 and 15 and set in between the plates 12 and 14 and exerting an extending pressure tending to spread said plates apart.

17 is an electric motor supported from the bottom of the car body. 18 is a U-shaped bracket rigidly secured to said motor and extending downwardly therefrom.

19 is a train of gears mounted on suitable shafts and said shafts are journaled in suitable bearings supported between the sides of the bracket 18. The train of gears 19 is operatively connected with the armature of the motor 17.

20 is a spur pinion forming the last gear of the train of gears 19 and arranged between the sides of the bracket 18 near the lower end thereof and meshing with the rack 21 extending through and sliding in the slots 22 in the sides of said bracket. The rack 21 is connected at one end to the extending ends of the rods 15 thus operatively connecting said rods with the motor 17. The length of the distance of travel of the rack 21 and consequently of the rods 15 is governed by the adjustment of the movable stops 23 which may be rigidly secured at any desired place on the said rack, so as to contact with the outer surface of the bracket 18 at the end of a stroke.

The compression spring 16 exerting a constant spreading pressure between the plates 12 and 14 pulls on the rod 11. The movement of the rod 11 causes the lever 7 to swing on its pivot and the motion of said lever through the connecting rod 10 swings the lever 5 on its pivot, thus drawing the brake beam towards the wheels 2 and applying shoes thereto. The energizing of the motor 17 moves the rack 21 until the inner stop 23 abuts the outer surface of the bracket and as the rods 15 are connected to said rack, the plate 14 will be drawn along on the rod 11 and the spring 16 further compressed, thus increasing the pressure on the plate 12 consequently increasing the pressure of the brake shoes on the wheels.

While the car is in motion the motor 17 is continually energized through the arrangement of the electric circuits hereinafter described. Immediately on the shutting off of the power the current to the motor is cut off and it will therefore be seen that the spring 16 pushing against the plate 14 will pull on the rods 15 and rack 21 moving the said rack until the outer stop 23 abuts the face of the bracket 18. As the rack 21 is moved by the pull of the spring 16 the train of gears 19 and the armature of the motor 17 rotate freely, the said gears and armature acting as a governor and retarding to some extent the movement of the said rack. The pressure of the spring 16 against the plates 12 and 14 gradually reduces as the rack slides, consequently the pull on the rod 11 and levers 7 and 5 and the pressure of the brake shoes against the wheels is gradually diminished.

The mechanism for automatically increasing and diminishing the pressure of the brake shoes, as herein described, is particularly adapted for cars which travel at a high rate of speed, so that when an application of the brakes is made, the initial application will be much stronger than when the speed of the car has been reduced, that is to say, immediately on the cutting out of the current and an immediate application of the brakes being made, the brakes are applied very strongly but as the armature of the motor 17 is deenergized and the train of gears 19 free to rotate, the rack 21 slides in the bracket 18 and the pressure of the spring 16 is partly relieved and the pressure on the brake shoes consequently reduced as the speed of the car diminishes thus making a graduated application of the brakes.

The regulating and governing mechanism is not absolutely essential to the operation of this device and may be dispensed with if desired. The tension of the spring 16 may be adjusted by shifting the stop 23 at the outer end of the rack 21, or it may be adjusted by hand through the vertical shaft 24 which may extend to any desired place in the car within easy reach of the operator, the shaft being operatively connected to the shaft of the spur pinion 20 through the bevel gears 25.

The brakes are released by means of the magnet 9, the armature 27 of which is pivoted at one end in the bracket 28 rigidly secured to said magnet. The armature 27 of the magnet 9 is connected to the lever 7 by a link 29 pivotally secured to said armature and to said lever intermediate of its length. When an application of the brakes is made, the lever 7 pulling on the link 29 swings the armature 27 on its pivot and on the magnet being energized the armature is drawn to it and the lever 7 swung on its pivot against the pull of the spring 16 and the brakes released. In order to obviate any sudden jarring or strain on the lever 7 and brake equipment on the releasing of the brakes, I provide a simple device for cushioning the lever 7.

30 is a rod abutting the edge of the lever 7 and extending through the head of the air cylinder 31 secured to the magnet 9 at the opposite end to the bracket 8 though it may be secured to the car body in any desirable manner.

32 is a piston operating in the cylinder 31 and rigidly secured to the rod 30 intermediate of its length. 33 is an elongated cylindrical casing at the other end of the cylinder 31. 34 is a spiral compression spring inclosed within said casing and exerting a forward pressure against the backwardly extending end of the rod 30, holding the forward end in engagement with the lever 7.

35 are air cocks opening from each end of the cylinder 31 to allow the escape of air from the said cylinder at either side of the piston 32, said cocks being properly adjusted to regulate the escape of the air from said cylinder.

It will be seen that when the brakes are applied, the piston 32 will be moved to the forward end of the cylinder by the spring 34 pushing forward on the rod 30 and the forward end of the rod held against the lever 7. On the magnet 9 being energized, the armature 27 is attracted and as the pull of the said magnet overbalances the pull of the spring 16, the brakes will be released. As the lever 7 swings on its pivot it forces the rod 30 and piston 32 inwardly and the said piston cushioning against the air in the cylinder absorbs the shock of the sudden movement of the said lever. The air in the cylinder escapes slowly through the air cock 35 at the rear end, allowing the piston to travel to the rear head of the cylinder and the lever 7 to the limit of its stroke.

The pull of the spring 16 on the lever 7 is of course quite strong in order to exert sufficient pressure for the brake shoes to stop the car and it will be readily understood that the pull of the electro-magnet 9 on its armature must also be very strong to overbalance the spring pull. It will therefore be seen that a very heavy electric current must flow through the magnet 9 to exert sufficient pull to overbalance the spring pull and as it would not be economical to have the electric current flowing through said magnet for any length of time I have devised a simple and effective mechanism for holding the lever 7 in its released position and for controlling the application of the brakes.

36 is a rack having the gear teeth cut in one side thereof. The rack 36 is pivotally secured to the outer end of the lever 7 and slidably arranged in suitable guides supported by a bracket 37 depending from the car body.

38 is a spur pinion meshing with the rack 36 and secured to a sleeve 39. The sleeve 39 is rotatably mounted on a pin 40 secured to the bracket 37. The pin 40 and sleeve 39 extend upwardly from the bracket 37 through a guiding arm 41 secured to the upper side of said bracket.

42 is a ratchet disk rotatably mounted on the sleeve 39 above the arm 41 of the bracket 37 and having radially arranged ratchet teeth 43 in its upper face and a broad flange 44 at its outer edge.

45 is a block fixedly secured to the upper end of the sleeve 39. 46 are pawls pivotally secured to said block at opposite sides and engaging the ratchet teeth 43 on the disk 42.

47 are spring arms secured to the upper surface of the block 45 extending over the pawls 46 and holding them in engagement with said ratchet teeth.

48 is a brake band surrounding the flat peripheral face 44 of the disk 42 and secured at one end by the pin 49 to the arm 41.

50 is a lever pivotally secured to a pin 51 also secured in the arm 41. The lever 50 is provided with a hook shaped end 52 adapted to engage the free end of the brake band 48.

53 is a link secured at one end to the outer end of the lever 50 and at the other end to the pivoted armature 54 of the electro-magnet 55.

It will be seen that from the above description of parts that a free application of the brakes is not interfered with as when the magnet 55 is deënergized the armature 54 will be free to swing on its pivot, thus loosening the brake band 48 and freeing the disk 42 then the pressure of the spring 16 pulling on the rod 11 and lever 7 moves the rack 36 with said lever, and rotates the pinion 41 and sleeve 39 and as the block 45 is secured to said sleeve it will also rotate, the pawls 46 catching in the ratchet teeth 43, and rotating the disk 42.

The movement of the lever 7 may be stopped at any period of the application of the brakes by energizing the magnet 55. The armature 54, swinging on its pivot, pulls on the link 53 and lever 50, and tightens the brake band 48 on the periphery of the disk 42. The disk 42 is then held and in turn holds the sleeve 39 and pinion 38, consequently locking the rack 36 and lever 7.

56 is a supplementary electro-magnet having the armature thereof suitably connected to the lever 50. The magnet 56 is much smaller than the magnet 55 and is included in a different electric circuit from the aforesaid magnet and used for a purpose hereinafter described.

57 is the controller for controlling the operation of the brakes, having the cylinder 58 journaled at the ends.

59 are contact plates arranged in series in vertical alinement and secured to the cylinder 58.

60 is a spring contact finger secured to the casing of the controller and engaging the uppermost contact plate 59.

61 are contact fingers adapted to bridge the successive contact plates 59 coincidently with the engagement of the finger 60 with the upper of said contact plates, thus making a continuous electrical connection from the contact finger 60 through the successive contact plates and bridging fingers to the last finger 62 in the series.

The finger 62 is electrically connected through the wire 63 to the current supply wire 64, and the finger 60 is electrically connected through the wire 65 to the magnet 9, and the terminal 66 of the said magnet is electrically connected to the ground wire 67 thus completing the circuit. The series of contact plates and fingers are provided so that when the controller cylinder is turned to break the circuit of the magnet 9, the break will be distributed over a number of points thus eliminating any sparking or flashing at the breaking point. This arrangement of contacts is necessary as a current of high voltage flows through this circuit.

68 is a contact plate secured to the cylinder 58 to one side of the contact plates 59, and therebelow and engaged by the spring contact fingers 69, secured to the controller casing, on the rotation of the cylinder after the circuit to the magnet 9 is broken. One of the contact fingers 69 is electrically connected to the current supply wire 64 through the wire 63 and the other of said fingers is electrically connected through the wire 70 to the wire 71 at the forward end of the car. Therefore the electric current flows to the wire 71 on the plate 68 being brought into contact with said fingers by the rotation of the controller cylinder.

The wire 71 extends throughout the length of the car and at the rear end of the said car is electrically connected to the wire 72 through the looped wire 71$^a$ and as the electric current supply to the wire 72 is transmitted through the said wire 71 it will be seen that the current will have to flow the full length of the car, or if a number of cars are coupled together, the loop 71$^a$ will be connected to the wires 71 and 72 at the rear end of the train, and the current flow the length of the train of cars before it reaches the wire 72. It will therefore be readily understood that any break in the length of the wire 71 between the controller at the front end and the loop connection at the rear end will interrupt the flow of current to the wire 72.

The magnet 55 in each car is electrically connected to the wire 72 through the wire 73 and the electrical circuit through said magnet is closed through the wire 74 leading to the ground wire 67. It will be readily apparent that in the event of the flow of current to the wire 72 being interrupted, the armature of the magnet 55 will be released and an application of the brakes will follow. A suitable resistance 75 is introduced in the wire 73 in order to modify the current flowing through the magnet 55 so that the magnetic pull on the armature of said magnet will be just sufficient to hold the brake band 48 tightly and the disk 42 from turning.

76 is a handle secured to the shaft of the controller cylinder 58, having a projecting stop 77 on its inner end.

78 is a spring-held plunger projecting outwardly from a casing 79 located on top of said controller said plunger being adapted to engage the stop 77 when the handle 76 is turned to close the circuit through the magnet 9. Only a momentary flow of current through the magnet 9 is required to release the brakes and a very strong spring is used to operate the plunger 78 so that the operator will be reminded by the heavy pressure that a long period of contact is unnecessary.

80 is a spring plunger similar to the plunger 78, held within a casing 81 and opposed to the aforesaid plunger, engaging the stop 77 at the end of the reverse movement of the handle 76. The spring of the plunger 81 is much weaker than that of the plunger 78 and exerts but a very light spring pressure against the controller handle though sufficient to insure the handle being held in order to keep the contact fingers 69 in contact with the plate 68 and thereby closing the electrical circuit to the magnet 55 and holding the brakes released.

In Fig. 6 I show a mechanical means for holding the brake band 48. 82 is a rod secured to the outer end of the lever 50 and extending through the plate 83 the latter being suitably supported from the car body. 84 is a spiral compression spring surrounding the rod 82 and exerting a pull thereon and operating the lever 50 to tighten the brake band and hold the disk 42 from rotation. 85 is a rod also secured to the outer end of the lever 50 and extending forwardly to the front of the car and connected to a crank lever 86, the said lever operated by hand or foot to pull forwardly on the rod 85 and release the said brake band.

In order to insure an automatic application of the brakes being made on the derailing of a car, I break the wire 71 and carry the branch wires 87 and 88 to the brake beam 3 and connect them to the terminals of an electric switch 89 secured to said brake beam, as shown particularly in Fig. 4.

90 is a cross beam supported centrally by a link 91 from the operating portion of the switch 89. The beam 90 is supported close to the rails, so that in the event of the wheels leaving the track, it will contact with the rails and open the switch 89, thus breaking the circuit to the electro-magnet 55 and releasing the rack bar 36, allowing an application of the brakes.

In operation, the brake controller handle is held so that the circuit to the magnet 55 is closed and the brakes held released, but if an application of the brakes is desired, the said circuit is broken by the turning of the controller and the brakes are applied as described. The application of the brakes may be regulated to a nicety, for the controller may be moved to open and close the magnet circuit as often as may be desired during the application. The electric motor 17 operating the train of gears 23 and rack bar 19 is energized simultaneously with the magnet 55, being electrically connected to the wire 72 by a wire 92 and to the ground wire 67 through the wire 93. A suitable resistance 94 is introduced in the wire 92 to modify the current. Presuming that an application of the brakes has been made and it is desired to release them the controller is rotated to close the circuit to the magnet 9 and on the energizing of said magnet the brakes will be released as described.

In Fig. 3 I show diagrammatically, the wiring for a train of cars, the said train traveling in the direction of the arrow. The wires 64, 65, 67, 71 and 72 extend from end to end of each car and are electrically coupled together between the cars by suitable electric couplings, the wires 71 and 72 being electrically connected at the rear end of the train of cars by the loop 71ᵃ. The current flowing from the controller to the wire 71 will flow the full length of the train in order to flow through the wire 72 and the different circuits connected therewith. It will therefore be seen that in the event of the train breaking apart, the circuit will be broken and an application of the brakes on the whole train will follow.

In order to allow the forward end of a train to move away from the rear end in the event of the said train breaking in two, I have provided the small electro-magnet 56, the armature of which is connected to the lever 50. The magnet 56 is electrically connected to the wire 71 through a wire 95 in which is inserted a suitable resistance 96 and the circuit is completed through a wire 97 leading to the ground wire 67. It will be readily seen that when the train breaks apart and the circuit to the wire 72 broken, consequently cutting out the magnet 55 and motor 26, the magnet 56 will not be affected on the cars connected to the front end of the train as its circuit is energized from the wire 71. The magnet 56 is not strong enough to hold the brake band 48 firmly and entirely prevent the application of the brakes on the forward cars, but will retard the action of said brakes sufficiently to allow the said cars to move a safe distance from the detached cars and avoid any bumping which is liable to occur if an emergency application is made on all the cars simultaneously.

It will be understood from this description that the release of the brakes requires but a momentary application of power and also that very little electric energy will be necessary to hold the brakes released, therefore the device will be very economical.

The construction is very simple and cheap to manufacture and a brake operating mechanism is produced which is absolutely automatic in case of emergency and does not depend on the supply of electric energy to make an application.

Any desired graduation of application of the brakes may be made and a high speed application is provided for. A brake as herein described may also be readily applied to steam or air operated trains and merely requires the installation of a suitable generator on the locomotive to supply the necessary electric energy.

What I claim as my invention is:—

1. In an automatic car brake, a chain of operating levers, a plurality of rods slidably associated and pivotally connected with one of said levers, an extensible member governing one sliding movement of said rods, and an electric machine governing the other sliding movement of said rods, substantially as described.

2. In an automatic car brake, the combination with the brake beam and shoes, of a chain of levers pivotally connected one to the other and to said brake beam and the car body, a rod pivotally secured to the lever pivoted to the car body, a rod slidably associated with said rod, a helical spring encircling said rods and governing the sliding movement thereof in one direction, and an electric machine governing the sliding movement of said rods in the other direction, substantially as described.

3. In an automatic car brake, the combination with the brake beam and shoes, of a chain of levers pivotally connected one to the other and to said brake beam and the car body, a rod pivotally secured to the lever extending from the car body, a rod slidably associated with the aforesaid rod, a helical spring encircling said rods and governing the sliding movement thereof in one direction and effecting a spring pull on said brake beam and shoes, an electric machine suitably connected to the lever extending from the car body and adapted to overcome the spring pull on said lever, and means for holding said lever following the operation of said electric machine, substantially as described.

4. In an automatic car brake, the combination with a spring actuated brake having a pivoted lever introduced between and connected with the spring and the brake shoes, of an electro-magnet having its armature linked to said lever and electrically connected to a supply of electric current and effecting an electrical pull on said lever greater than the mechanical pull of the spring, substantially as described.

5. In an automatic car brake, the combination with a brake mechanism having a pivoted operating lever and a spring pulling on said lever, of an electro-magnet suitably supported in proximity to said lever and having a pivoted armature linked to said lever and effecting an electrical pull greater than the mechanical pull of said spring on said lever, independent means electrically controlled for retaining said lever in the position following the pull of said armature, substantially as described.

6. In an automatic car brake, the combination with the brake beam and brake shoes engaging the wheels of the car and the brake lever connected to said brake beam, of a lever pivotally supported under the car and extending substantially parallel with the said brake lever and pivotally connected therewith, a rod pivotally secured to said lever intermediate of its length and extending laterally therefrom and having a rigid stop plate at its outer end, a pair of rods extending through said stop plate and slidably arranged therein and having a stop plate at their inner ends rigidly secured thereto and encompassing the aforesaid rod, a spiral spring compressed between said plates and encircling all of said rods, and adjustable means at the end of said pair of rods for regulating the compression of said spring, substantially as described.

7. In an automatic car brake, the combination with the brake beam and brake shoes engaging the wheels of the car and the brake lever connected to said brake beam, of a lever pivotally secured under the car and extending substantially parallel with said brake lever and pivotally connected thereto towards its outer end, a spring mechanism pivotally connected to said lever intermediate of its length and exerting a constant pull thereon for applying the brakes, an electric means for exerting a greater pull than said spring and opposing the same attached to said lever intermediate of its length, and an air cylinder having a spring-held piston therein and a piston rod extending therefrom engaging said lever and forming a cushion against said electric pull, substantially as described.

8. In an automatic car brake, the combination with the brake beam and brake shoes engaging the wheels of the car and the brake lever connected to said brake beam, of a lever pivoted under said car and extending substantially parallel with said brake lever, a spring mechanism attached to said lever intermediate of its length having an arrangement of slidable rods, a motor secured under the car, and a gear mechanism operated by said motor and attached to the end of said rods and adapted to adjust the compression of said spring, substantially as described.

9. In an automatic car brake, the combination with the brake beam and brake shoes engaging the wheels of the car and the brake lever connected to said brake beam, of a lever pivotally supported under said car at one of its ends and extending substantially parallel to said brake lever and pivotally connected therewith, a spring actuated mechanism pivotally secured to said lever intermediate of its length for applying the brakes, means secured to the other side of said lever for effecting a pull thereon greater than the pull of said spring actuated mechanism, a rack pivotally secured to the other end of said lever and extending laterally therefrom, a bracket suitably supported under said car, a pinion journaled from said bracket and co-acting with said rack, a sleeve rigid with said pinion and extending upwardly and carrying a block at its upper end, pawls pivoted from said block, a disk loosely encircling said sleeve and having a row of ratchet teeth on its upper face towards its outer edge and a band encircling said outer edge, a brake band rigidly secured to a pin from said bracket and encircling the aforesaid band, a pivoted lever connected to the free end of said brake band at one end, and an electro-magnet having its armature connected to the other end of the latter lever and drawing on said band for stopping the rotation of said disk, substantially as described.

10. In an automatic car brake, the combination with the brake beam and brake shoes engaging the wheels of the car and the brake lever connected to said brake beam, of a lever pivotally supported under said car at one of its ends and extending substantially parallel to said brake lever and pivotally connected therewith, a spring actuated mechanism pivotally secured to said lever intermediate of its length for applying the brakes, means secured to the other side of said lever for effecting an opposing pull thereon greater than the pull of said spring mechanism, a rack pivotally secured to the outer end of said lever and extending laterally therefrom, a bracket suitably supported under said car, a pinion journaled from said bracket and co-acting with said rack, a sleeve rigid with said pinion and extending upwardly and carrying a block at its upper end, pawls pivoted from said block, a disk loosely encircling said sleeve and having a row of ratchet teeth on the upper face towards its outer edge and engaging said pawls and a band encircling said outer edge, a brake band rigidly secured to a pin from said bracket and encircling the aforesaid band, a pivoted lever connected to the free end of said brake band at one end, and means connected to the said lever for tightening said brake band on the aforesaid band for stopping the rotation of said disk and said pinion and holding the brake released, substantially as described.

11. In an automatic car brake, the combination with a brake, of an electric device for releasing said brake, an electric controller having a cylindrical member and a plurality of contacts on said member and a plurality of contact fingers co-acting with the said contacts rigid with the casing thereof, and an electric circuit suitably energized including said magnet and connected to the end contact fingers secured to said casing, substantially as described.

12. In a device of the class described, in combination, a spring actuated brake, a motor adjusting the spring mechanism of said brake, an electro-magnet opposing the spring pull of said spring mechanism, an electro-magnet retaining the brake in its released position following the pull of the aforesaid electro-magnet, an electric controller, an electric circuit including said controller and the first named magnet and releasing said brakes on the operation of said controller, and an electric circuit including controller and said motor and the second magnet and adapted to be constantly energized during the movement of the car to hold the brakes released, substantially as described.

13. In an automatic car brake, the combination with a spring actuated brake applying mechanism, of an electric device connected to said brake applying mechanism and overbalancing the spring pull in said mechanism on the flow of electric current therethrough, an electric conductor leading from a supply of electric current extending throughout the length of a train of cars, and electrically connected to said electric device in said cars, means for controlling the flow of electric current through said electric conductor, an electric conductor extending throughout the length of a train of cars and connected to a supply of electric current, means for controlling the supply of electric current to said conductor at one end thereof, an electric conductor extending throughout the length of a train of cars and electrically connected to the latter conductor at the opposite end to which said controlling means is connected, electrically controlled means for holding said brake applying mechanism in its release position electrically connected to the latter mentioned conductor and adapted to allow the application of the brakes on the breaking of the electric circuit therethrough, and means for controlling said electric circuit, substantially as described.

14. In a device of the class described, the combination with a spring actuated brake applying mechanism, of an electric device adapted to overbalance the spring pull in said brake applying mechanism on the flow of electric current therethrough, an electric conductor extending from end to end of the car and adapted to be electrically connected throughout the length of a train of cars and electrically connected to the said electric device, a controller electrically connected to said conductor and to a supply of electric current and controlling the flow of current through said conductor and said device, an electric conductor extending from end to end of the car and adapted to be electrically connected throughout the length of a train of cars and to said controller, an electric conductor parallelly arranged and extending the length of the cars and electrically connected to the latter conductor at the rear end of the train of cars, an electrically controlled device connected to said spring actuated brake applying device and holding it in its release position and electrically connected to the latter of said electrical conductors, a supplementary electrical device controlling said holding device electrically connected to the second aforementioned conductor, and means independent of said controller for breaking said second aforementioned conductor, substantially as described.

JAMES HARRY KEIGHLY McCOLLUM.

Witnesses:
B. BOYD,
A. CRIGHTON.